United States Patent
Sudo

(10) Patent No.: US 7,269,774 B2
(45) Date of Patent: Sep. 11, 2007

(54) DATA RECEIVING APPARATUS, DATA TRANSMITTING APPARATUS AND RETRANSMISSION REQUEST METHOD

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 484 days.

(21) Appl. No.: 10/484,951

(22) PCT Filed: Mar. 19, 2003

(86) PCT No.: PCT/JP03/03290

§ 371 (c)(1),
(2), (4) Date: Jan. 28, 2004

(87) PCT Pub. No.: WO03/084108

PCT Pub. Date: Oct. 9, 2003

(65) Prior Publication Data

US 2004/0255220 A1    Dec. 16, 2004

(30) Foreign Application Priority Data

Mar. 29, 2002  (JP) .............................. 2002-097468

(51) Int. Cl.
*H04L 1/00*    (2006.01)
(52) U.S. Cl. ....................... 714/748; 714/704
(58) Field of Classification Search ................ 714/748, 714/704
See application file for complete search history.

(56) References Cited

U.S. PATENT DOCUMENTS

| 5,646,935 | A  |   | 7/1997 | Ishikawa et al. |
|-----------|----|---|--------|-----------------|
| 6,021,516 | A  | * | 2/2000 | Okajima et al. ............ 714/748 |
| 6,512,758 | B1 | * | 1/2003 | Sato et al. .................. 370/344 |
| 6,735,256 | B1 | * | 5/2004 | Toshimitsu ................. 375/260 |

FOREIGN PATENT DOCUMENTS

JP        3107528        5/1991

(Continued)

OTHER PUBLICATIONS

International Search Report dated May 27, 2003.

(Continued)

*Primary Examiner*—Guy Lamarre
*Assistant Examiner*—Esaw Abraham
(74) *Attorney, Agent, or Firm*—Stevens, Davis, Miller & Mosher, LLP

(57) ABSTRACT

A data retransmission method, providing a practical ARQ (Automatic Repeat request) scheme in multicarrier communication such as OFDM. According to this method, all the carriers (i.e. subcarriers) are divided into a number of groups in advance, and these groups serve as the unit of data retransmission. An error detection code is attached on a per transmission symbol basis and transmission is performed, and, when mobile terminal apparatus 100 at the receiving end detects an error, subcarrier information obtainer 130 counts the number of carriers having received level below predetermined standard on a per group basis, and makes the group having the count value above a threshold level subject to retransmission request.

14 Claims, 14 Drawing Sheets

FOREIGN PATENT DOCUMENTS

| | | |
|---|---|---|
| JP | 07254915 | 10/1995 |
| JP | 07321765 | 12/1995 |
| JP | 11055206 | 2/1999 |
| JP | 11252056 | 9/1999 |
| JP | 2000031944 | 1/2000 |
| JP | 2000224140 | 8/2000 |
| JP | 2001077788 | 3/2001 |

OTHER PUBLICATIONS

H. Atarashi, et al.; "Partial Frequency ARQ for Multi-Carrier Packet Communication," IEICE, Sydney, Australia, Nov. 20-24, 1994, pp. 1101-1105.

T. Tsubaki, et al.; "OFDM Subcarrier Information Aided ARQ for Wireless ATM," The Institute of Electronics, Information and Communication Engineers, Technical Report of IEICE, A-P97-129, RCS97-144 (Dec. 1997), 8 pages, with English Abstract.

* cited by examiner

DATA RECEIVING APPARATUS, DATA TRANSMITTING APPARATUS AND RETRANSMISSION REQUEST METHOD

TECHNICAL FIELD

The present invention relates to a data retransmission method and a communication apparatus with a data retransmission controller in multicarrier communication.

BACKGROUND ART

One variation of multicarrier communications, OFDM (Orthogonal Frequency Division Multiplex) is known to be an effective measure against frequency selective fading in mobile communications.

OFDM increases the symbol length by sorting a temporal data symbol sequence into a number of subcarriers (i.e. carrier waves) having orthogonal frequencies, and reduces the impact of inter-code interference of delay waves by attaching guard intervals.

In recent years, such art has been attracting attention that implements high speed multimedia mobile communication by combining wired network communication using optical fiber (e.g., ATM (Asynchronous Transfer Mode) communication) and wireless communication of high reliability such as OFDM.

In ATM communication, for instance, four service classes (i.e. CRB, VBR, ABR, and UBR) are provided, and for each class the QoS (Quality of Service) is assigned. Upon file transfer, cases might occur where a low cell loss rate of approximately $10^{-9}$ is required including the application layer.

Consequently, to implement seamless connection of ATM network that uses high-quality optical fiber and wireless communication path, error control (i.e. QoS control) between wireless intervals becomes necessary.

Some ARQ (Automatic Repeat reQuest) schemes suitable for multicarrier communication (i.e. OFDM) have been proposed as effective methods of error control in frequency selective fading communication path.

Public document 1 (H. Atarashi et al "Partial Frequency ARQ for Multi-Carrier Packet Communication" IEICE TRAN. COMMUN. vol. E78-B August 1995) discloses an art of attaching an error detection code on a per data basis corresponding to separate carriers.

Public document 2 (Japanese Patent Publication No.11-55206) discloses an art of: attaching one error detection code per transmission packet taking into account that assigning an error detection code on a per carrier basis results in reduced transmission rates; upon detecting an error, specifying a carrier having received quality below a predetermined level; estimating that the error occurred with this carrier; and transmitting a retransmission request to the transmitting end using a carrier having received quality above a threshold level.

Using the art disclosed in aforementioned public document 2, it is possible to improve the transmission rate compared to the art disclosed in public document 1.

However, to transmit a retransmission request, it is necessary to check the received quality of each of many carriers (i.e. carrier waves), memorize information about all carriers that do not meet predetermined quality, and include in the transmission request information that specify the carrier corresponding to the data to which retransmission is desired. If the number of carriers used increases, the number of bits in the information increases as well, which then becomes a factor for reduced transmission rates.

In addition, processing for selecting the carriers for use upon transmission of the retransmission request is also necessary.

For instance, in OFDM, the number of carriers used is assumed to be up to several thousands, in view of which the above-described prior arts still have many problems that need to be overcome before practical use in multimedia communication and the like which require high speed.

DISCLOSURE OF INVENTION

It is therefore an object of the present invention to provide a novel data retransmission method and a communication apparatus with a retransmission controller that, using ARQ scheme in multicarrier communication, simplify retransmission processing and reduce the load of a transmitter/receiver, and that maintain practically usable levels of retransmission rate.

In accordance with an embodiment of the present invention, a data retransmission method is provided that divides a number of carrier waves for use in multicarrier communication into a number of groups in advance, and, when performing error correction of ARQ scheme, performs retransmission processing per group unit.

In accordance with another embodiment of the present invention, a data retransmission method is provided that: at an apparatus at a transmitting end, transmits data using a plurality of carrier waves comprising a plurality of groups; and at an apparatus at a receiving end, receiving the plurality of carrier waves from the apparatus at the transmitting end, performing demodulation processing of each carrier wave and obtaining receiving data, determining presence or absence of error though error detection processing, generating a retransmission request when there is an error and transmitting the request to the apparatus at the receiving end, wherein the retransmission request contains information that indicates which group among the plurality of groups of carrier waves is subject to the retransmission request.

One or more of the objects of the invention may be achieved by a data receiving apparatus having a receiver that receives from a data transmitting apparatus a plurality of data transmitted simultaneously by a plurality of carrier waves divided into a plurality of groups and a retransmission of data transmitted by a carrier wave included in one of the plurality of groups. A detector detects errors in a plurality of received data, and a transmitter transmits, when an error is detected in the plurality of received data, a retransmission request signal to the data transmitting apparatus. The retransmission request signal requests the retransmission of data transmitted by the carrier wave included in one of the plurality of groups by including information identifying the one group.

One or more of the objects of the invention may also be achieved by a data transmitting apparatus having a transmitter that simultaneously transmits to a data receiving apparatus a plurality of data simultaneously by a plurality of carrier waves divided into a plurality of groups. A receiver receives from the data receiving apparatus a retransmission request signal requesting a retransmission of data transmitted by a carrier wave included in one of the plurality of groups by identifying the one group. In accordance with the retransmission request signal received, the transmitter does not retransmit the data transmitted by carrier waves included in the plurality of groups excluding the one group, yet retransmits to the data receiving apparatus data transmitted by the carrier wave included in the one group.

One or more of the objects of the invention may be further achieved by a retransmission request method implemented on a data receiving apparatus. The method includes receiving from a data transmitting apparatus a plurality of data transmitted simultaneously by a plurality of carrier waves divided into a plurality of groups and detecting errors in a plurality of received data. When an error is detected in the plurality of received data, a retransmission request signal is transmitted to the data transmitting apparatus, the retransmission request signal requesting the retransmission of data transmitted by the carrier wave included in one of the plurality of groups by including information identifying the one group. The method further includes receiving from the data transmitting apparatus the retransmission of the data transmitted by the carrier wave included in the one group.

Furthermore, one or more of the objects of the invention may be achieved by a data retransmission method implemented on a data transmitting apparatus. The method includes simultaneously transmitting to a data receiving apparatus a plurality of data simultaneously by a plurality of carrier waves divided into a plurality of groups and receiving from the data receiving apparatus a retransmission request signal requesting a retransmission of data transmitted by a carrier wave included in one of the plurality of groups by identifying the one group. In accordance with the retransmission request signal received, not retransmitting the data transmitted by carrier waves included in the plurality of groups excluding the one group, yet retransmitting to the data receiving apparatus data transmitted by the carrier wave included in the one group.

BEST MODE FOR CARRYING OUT THE INVENTION

With reference to the accompanying drawings now, embodiments of the present invention will be described in detail below.

First Embodiment

Figure 1:
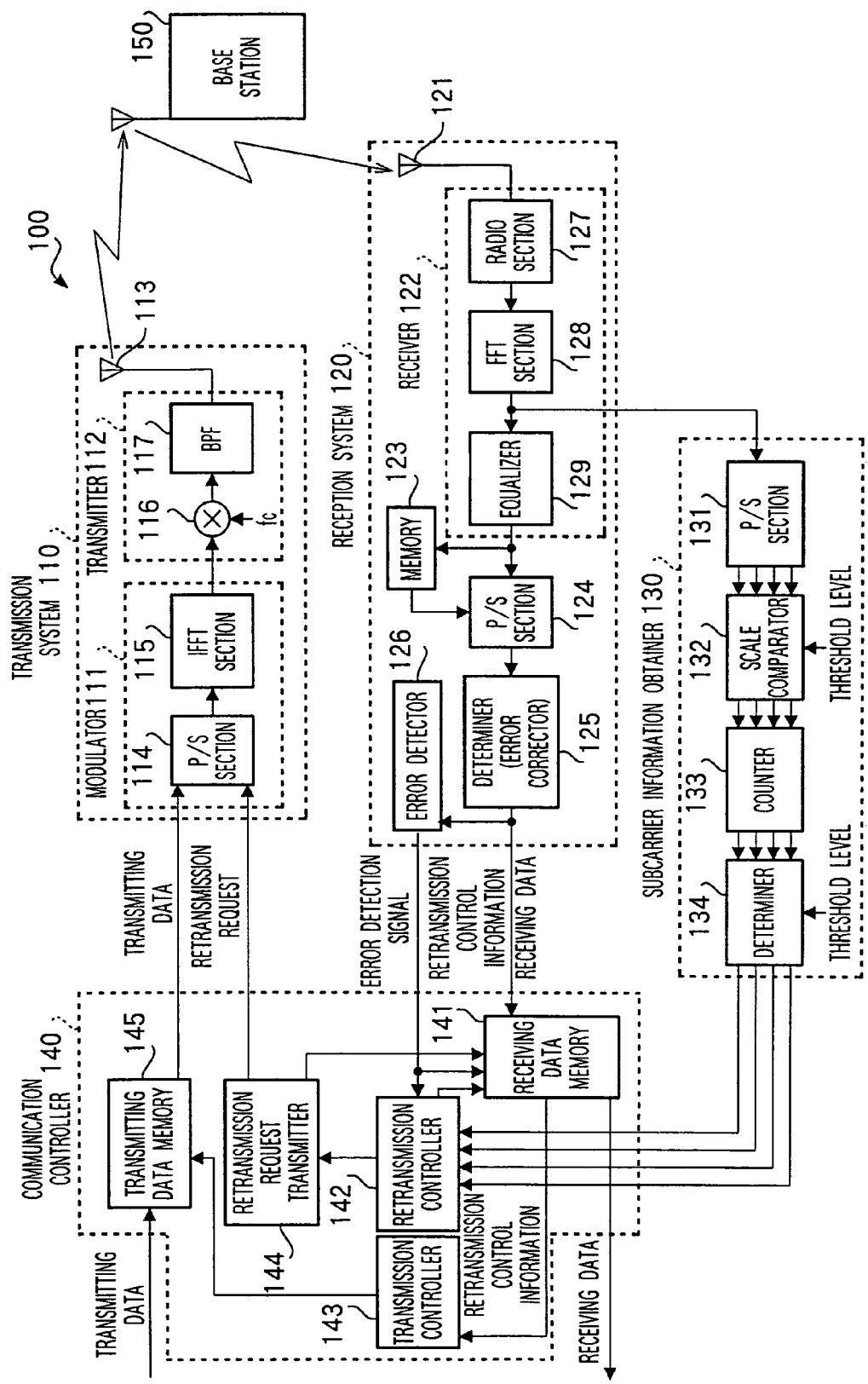
FIG. 1 is a block diagram showing a configuration of a communication apparatus (mobile terminal apparatus) according to the first embodiment of the present invention.

FIG. 1 is a block diagram showing a configuration of a mobile terminal with a data retransmission controller according to the present invention.

Figure 2:
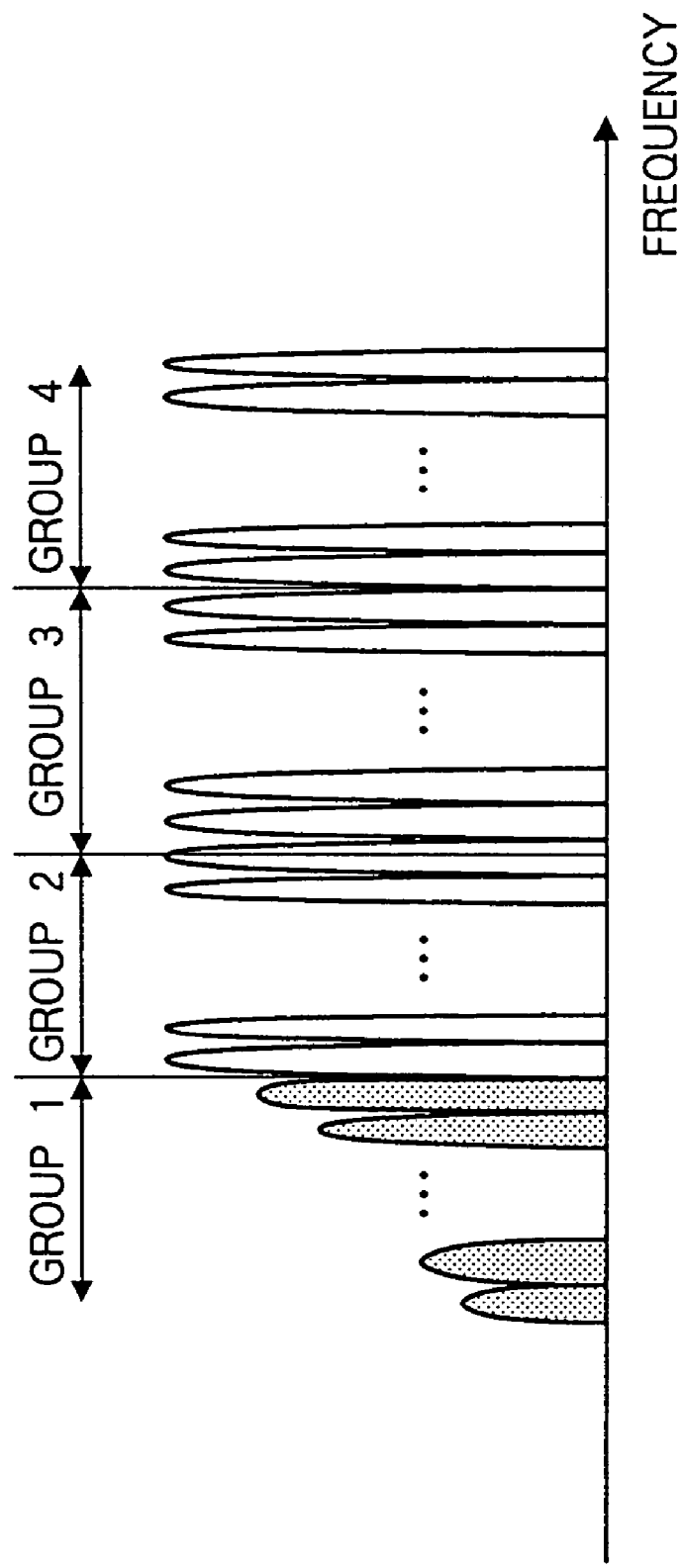
FIG. 2 is a drawing illustrating grouping of all subcarriers in OFDM.

Mobile terminal apparatus 100 and base station apparatus 150 of FIG. 1 perform communication of OFDM scheme. The carriers (i.e. subcarriers) used are divided into four groups in advance as shown in FIG. 2, and each group is assigned a number from "1" to "4," so as to identify each group by this number.

In the following description, the phrase "subcarrier" is used for convenience, which is a term of common use in OFDM communication, and which is a synonym for "carrier" (i.e. carrier wave) in multicarrier communication with no significant distinction.

Moreover, to perform error correction of ARQ scheme, the prerequisite is that an apparatus at the receiving end performs error detection of receiving data. In the case of multicarrier communication including OFDM, such methods as a method that attaches a code for error detection per data corresponding to separate subcarriers, and a method that, as in normal communication, attaches a code for error detection per transmission symbol (e.g. based on the unit of the packet or cell) and that, when an error is detected, estimates the location of the error and issues a retransmission request.

The data retransmission method of the present invention can be seen in light of the latter method, and is still applicable to the former method.

As shown in FIG. 1, mobile terminal apparatus 100 has transmission system 10, reception system 120, subcarrier information obtainer 130, and communication controller 140.

Subcarrier information obtainer 130 is a component that checks the received level of the subcarriers and obtains information for determining which group to make subject to retransmission.

Reception system 120 has antenna 121, receiver 122, memory 123, P/S (Parallel-Serial conversion) section 124, determiner 125 (error corrector) that performs Viterbi decoding and such, and error detector 126. Receiver 122 has radio section 127, FFT (Fast Fourier Transform) section 128, and equalizer 129.

Error detector 126, for instance, performs syndrome calculation with respect to a cyclic code and determines the presence or absence of errors (i.e. CRC scheme: Cyclic Redundancy Check).

Subcarrier information obtainer 130 has P/S section 131, scale comparator 132, counter 133, and determiner 134.

P/S section 131 sorts the signals indicating the level (i.e. received level) of received signals into the four groups shown in FIG. 2.

Scale comparator 132 compares each group's received level to a threshold level, and, when it is below the threshold level, outputs a determination signal indicating to that effect.

For every group, counter 133 counts the number of times the received level falls below the threshold level.

Determiner 134 determines whether or not there are groups in respect to which the count value on counter 133 exceeds a predetermined level, and, when there is such group, issues a report to that effect to retransmission controller 142 in communication controller 140. In FIG. 2, group 1 is made subject to retransmission.

Communication controller 140 has receiving data memory 141, retransmission controller 142, transmission controller 143, retransmission request transmitter 144, and transmitting data memory 145.

The receiving data is temporarily stored in receiving data memory 141. However, in actuality, when an error is detected at error detector 126 and retransmission processing is performed, only the data corresponding to other groups than the group subject to the retransmission is held.

Upon receiving a signal indicating the determination result from determiner 134 of subcarrier information obtainer 130, retransmission controller 142 reports the number of the group for which retransmission is desired (i.e. "1" in FIG. 2) to retransmission request transmitter 144 and receiving data memory 141.

Retransmission request transmitter 144 outputs a retransmission request signal (containing information about the number of the group subject to retransmission). This retransmission request signal is transmitted to base station apparatus 150 via transmission system 110.

Then, when the data is transmitted from the base station apparatus and received without error, the received retransmitting data and the data stored in receiving data memory 141 are combined and output as receiving data.

On the other hand, when the mobile terminal apparatus 600 is at the transmitting end and receives a retransmission request form base station apparatus 150, transmission controller 143 reads retransmission control information included in the received retransmission request signal from receiving data memory 141 and determines to which group to direct the retransmission.

Then, from transmitting data memory 145, of the data previously transmitted, only the data corresponding to the group subject to the retransmission is output. The retransmitting data is output to base station apparatus 150 via transmission system 110.

System 110 has modulator 111, transmitter 112, and transmission antenna 113. Modulator 111 has S/P (Serial-Parallel conversion) section 114 and IFFT (Inverse Fast Fourier Transform) section 115. Transmitter 112 has multiplier 116 and band pass filter 117 for multiplying the carriers fc.

Thus, the present embodiment divides all the subcarriers into four groups and determines whether or not to execute retransmission on a per group basis.

That is, when an error is detected at the receiving end, the group subject to retransmission is specified, and information that specifies this group is sent to the transmitting end. Then, all the data corresponding to all the carriers included in the specified group is retransmitted.

For instance, provided that the carriers are divided into four groups, two bits of information suffice to specify the group subject to retransmission. Consequently it is possible to reduce the information amount of a retransmission request signal.

By this means, without substantially increasing control information (in this case, two bits suffice to specify a group), it is possible to request retransmission efficiently at improved transmission rates.

Moreover, the present embodiment assumes the unit of the group, so that it is unnecessary to closely manage each subcarrier's information, thereby simplifying the retransmission processing. This is effective in implementing high speed communication.

Although the present embodiment is configured to divide all the subcarriers into four groups, this is by no means limiting.

Conventionally, ARQ schemes have held the idea of retransmitting only the data with error and correcting the error. In contrast to this, the present invention employs a novel method that, when an error is detected, makes an estimate as to which group is most likely to include the subcarriers corresponding to the data in which the error occurred from the received level and such, and performs retransmission on a per group basis.

OFDM is typically tolerant of frequency selective fading and is a highly reliable wireless communication scheme. Without strictly specifying the data in which error occurred, as long as it is clear which frequency band of subcarriers suffer the impact of fading, the data (of the group under) corresponding to the frequency band is retransmitted so as to maintain desired reliability with respect to ARQ control.

Moreover, OFDM employs methods that utilize an FFT operator and an IFFT operator to correctively convert data, so that, as for the retransmission processing of the data corresponding to the subcarriers included in one group (i.e. a bundle of subcarriers adjacent to each other), this too can be implemented without great difficulty by utilizing the above collective processing.

The present invention thus focuses on the characteristics of multicarrier communication as typified by OFDM, and implements a practical ARQ scheme that takes the use with actual communication terminals into account.

Furthermore, the retransmission controller shown in FIG. 1 (i.e. part that implements retransmission control, and at least carrier information obtainer 130 and retransmission controller 142 are components thereof) can be installed in not only a mobile terminal apparatus but also in a base station apparatus.

Still, when the retransmission controller of the present invention is installed in a base station apparatus, the base station apparatus needs to hold information as to for which group retransmission is requested, with respect to all users, and there may be cases where the processing amount of the retransmission processing increases and the capacity of memory that is necessary expands, and the burden on the hardware increases.

So, the retransmission controller of the present invention is optimal for installation in mobile terminal apparatus. That is, when the present application is applied to the downlink channel, there is little likelihood of decreased throughput, and so, practically, application to the downlink channel is preferable.

Figure 3:
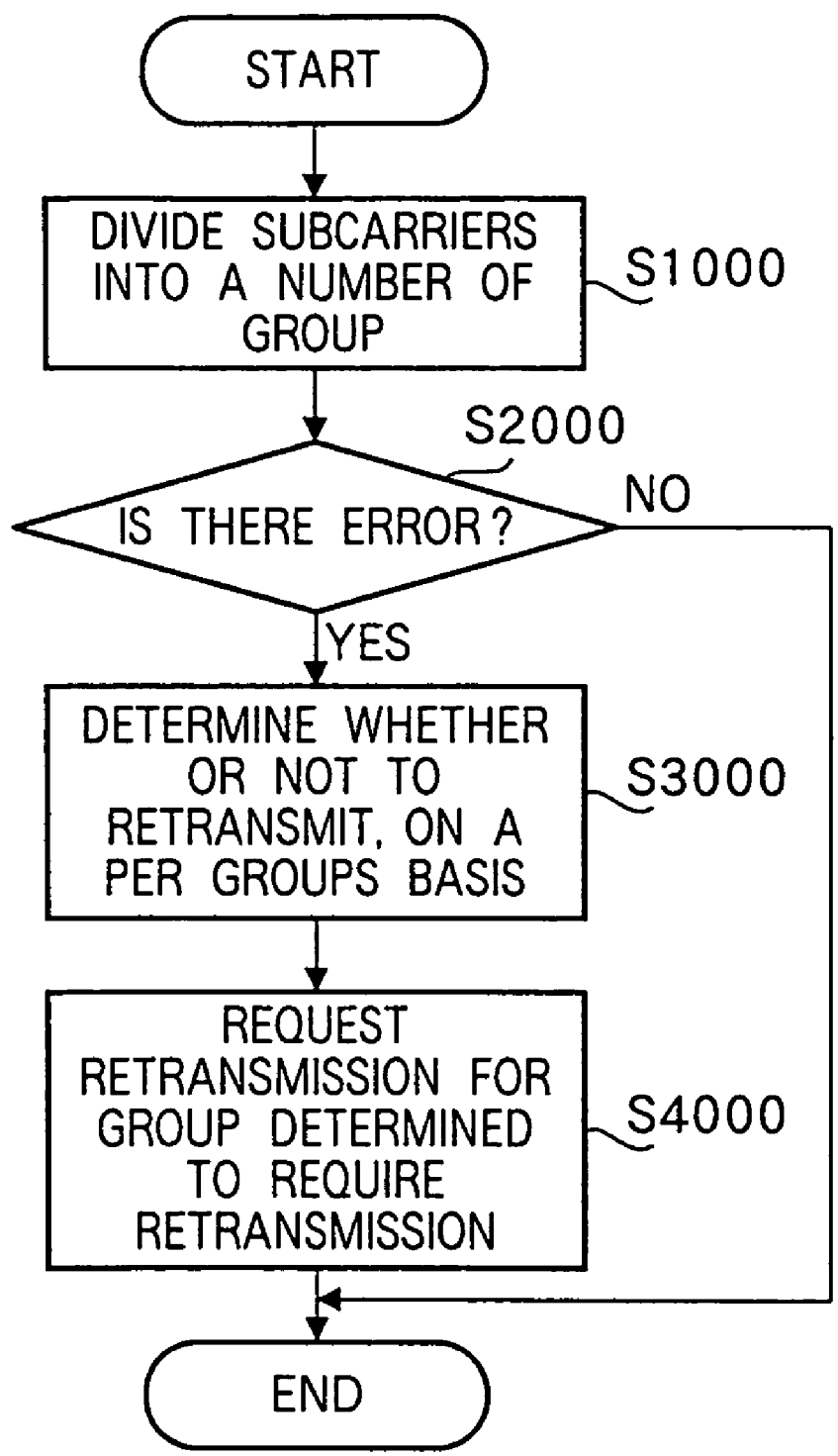
FIG. 3 is a flowchart showing major steps in a data retransmission method according to the present invention.

The above-described, characteristic operations of the ARQ scheme of the present invention can be summarized as shown in FIG. 3.

That is, all subcarriers are divided into a number of groups (Step S1000), and, when an error is detected at an apparatus at the receiving end (Step S2000), determination is made as to whether or not retransmission is necessary (Step S3000) on a per group basis.

Then, with respect to the group (i.e. the data corresponding to the subcarriers included therein) determined to require retransmission, retransmission is requested (Step S4000).

Second Embodiment

Figure 4:
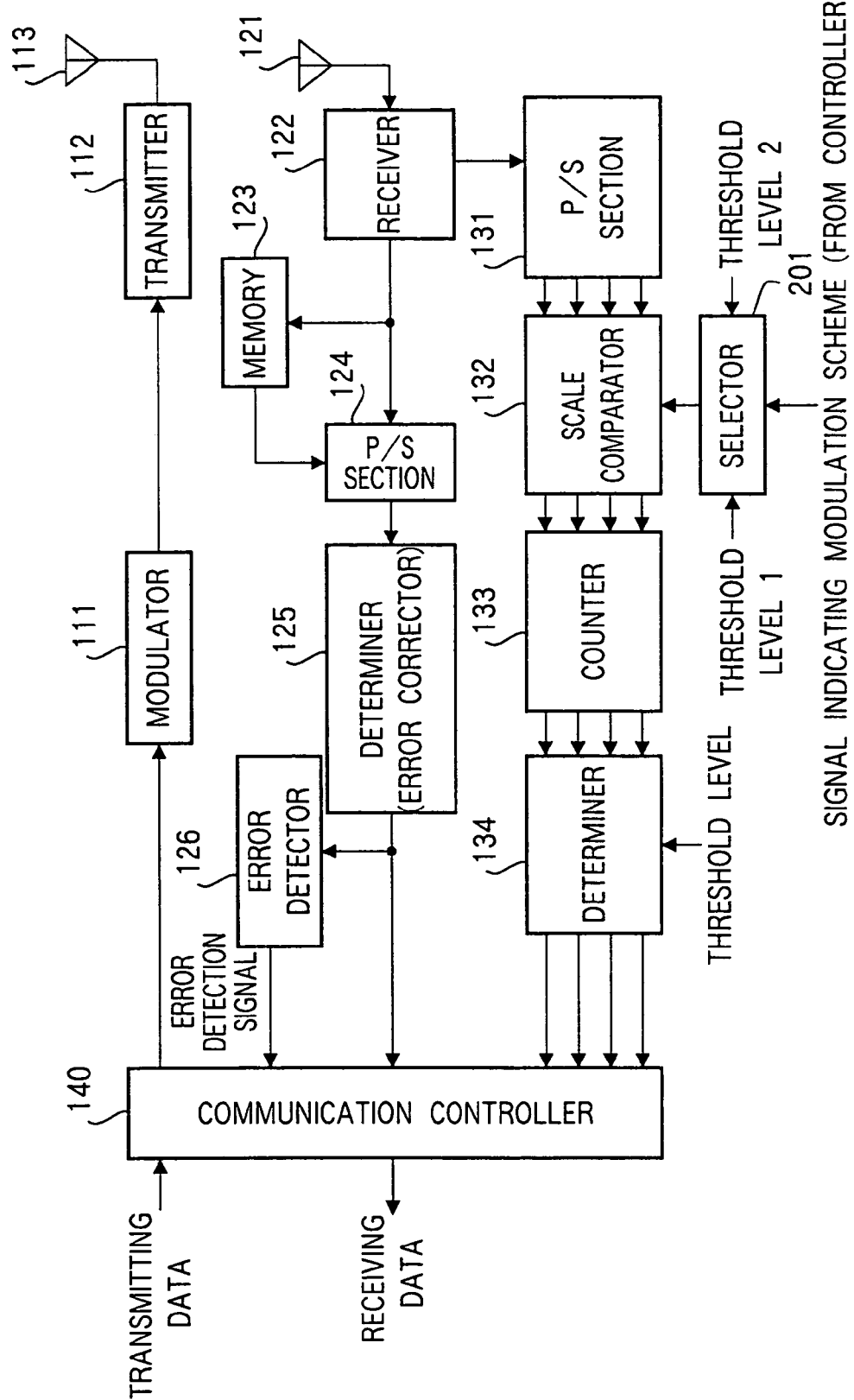
FIG. 4 is a block diagram showing a configuration of a communication apparatus (mobile terminal apparatus) according to a second embodiment of the present invention.

FIG. 4 is a block diagram showing a configuration of a mobile terminal apparatus according to a second embodiment.

A feature of the present embodiment is to change the threshold level (i.e. threshold level for checking whether or not a subcarrier has a falling received level) at scale comparator 132 in FIG. 1 in accordance with the modulation scheme of data.

Also, this may be changed according to the error correction coding rate.

In the case of M-ary modulation, when the M value is high, the likelihood of error increases even at low received levels. For this reason, in the case of the schemes that are prone to error such as 16QAM (Quadrature Amplitude Modulation) and 64QAM, the threshold level is set high to more strictly determine the necessity for retransmission.

By this means, the error correction function is reinforced.

Referring to FIG. 4, two threshold levels (i.e. threshold level 1 and threshold level 2) are set for use at scale comparator 132, and, based on the signals provided from a controller (not shown in the figure) indicating the modulation schemes, the threshold level for use is selected at selector 201.

The other parts are the same as the configuration of FIG. 1, and so explanation will be omitted. Parts that are identical to those of FIG. 1 are assigned the same numerals, and this is so throughout the following description.

Third Embodiment

Figure 5:
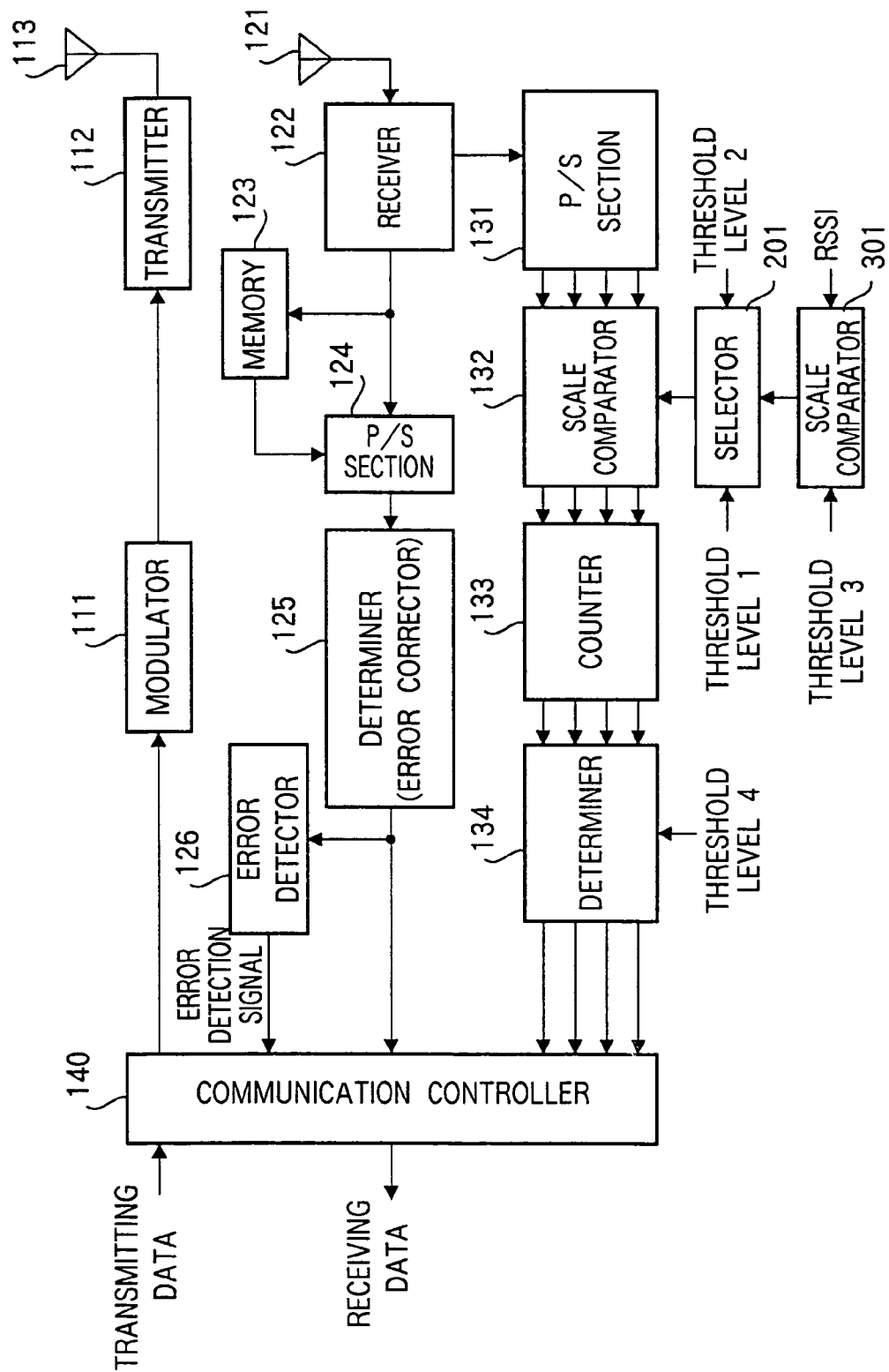
FIG. 5 is a block diagram showing a configuration of a communication apparatus (mobile terminal apparatus) according to a third embodiment of the present invention.

FIG. 5 is a block diagram showing a configuration of a mobile terminal apparatus according to a third embodiment.

A feature of the present invention is to adaptively change the threshold level (i.e. threshold level for determining whether a subcarrier has a falling received level) at scale comparator 132 of FIG. 1 in accordance with the received field level (i.e. RSSI: Received Signal Strength Indicator).

Generally, as the RSSI decreases, the likelihood of error increases even where the received level falls only by little. For this reason, depending on the RSSI, the threshold level for determining whether or not a subcarrier has a falling received level is changed.

That is, when the RSSI is large, the threshold level for determination is made small, and when the RSSI is small, the threshold level for determination is made large.

By this means, the error correction function is reinforced.

Referring to FIG. 5, scale comparator 301 is provided to compare the RSSI and threshold level 3, and, depending on the comparison result, selector 201 determines which one of threshold level 1 and threshold level 2 to select.

Fourth Embodiment

Figure 6:
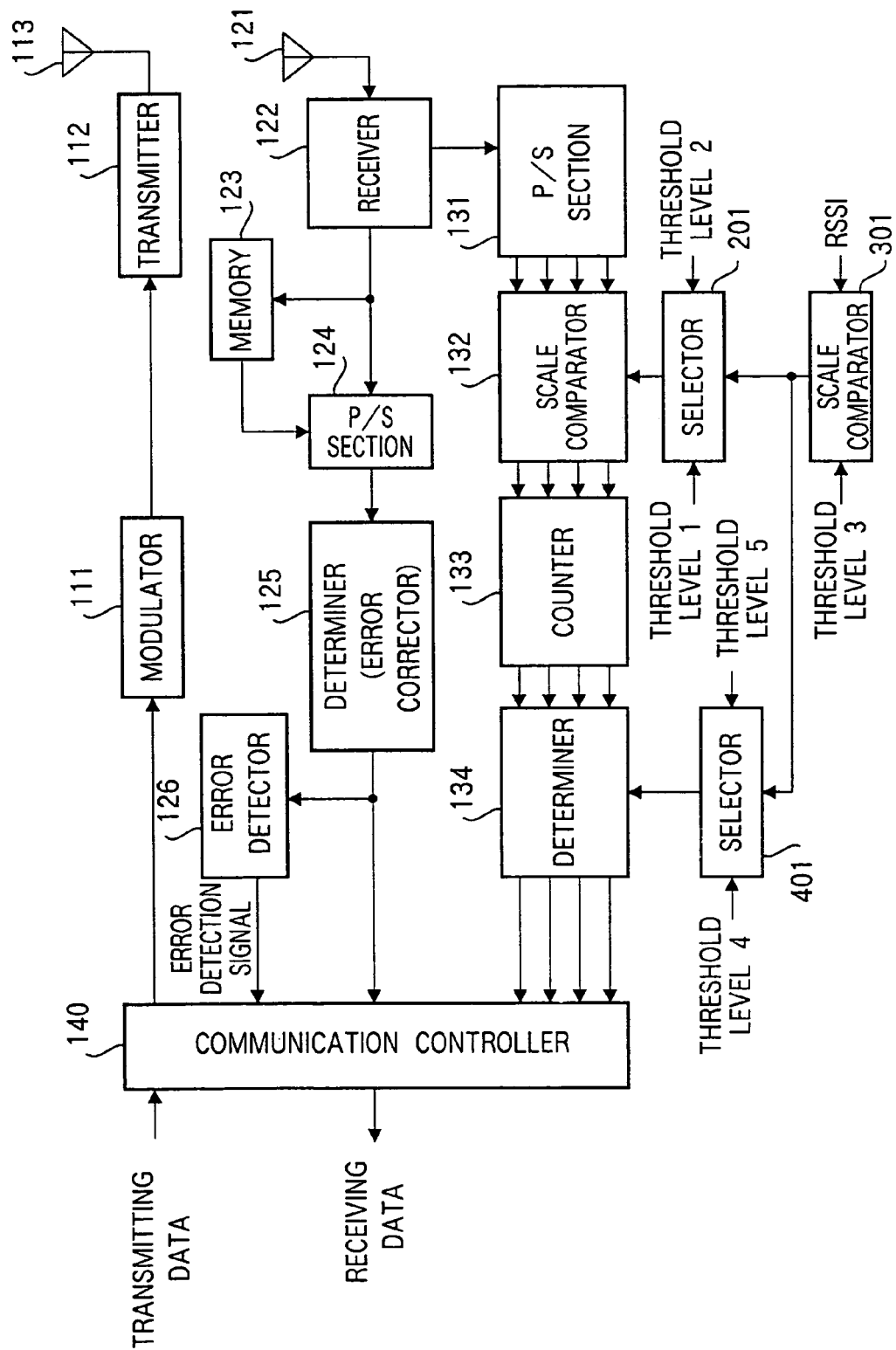
FIG. 6 is a block diagram showing a configuration of a communication apparatus (mobile terminal apparatus) according to a fourth embodiment of the present invention.

FIG. 6 is a block diagram showing a configuration of a mobile terminal apparatus according to a fourth embodiment.

A feature of the present invention is to change not only the threshold level (i.e. threshold level for determining whether or not a subcarrier has a falling received level) at scale comparator 132 but also the threshold level for use for comparison with the count value on counter 133 in accordance with the modulation scheme and RSSI.

The configuration in FIG. 6 is the configuration of FIG. 5 further added selector 601 and determining which one of threshold level 4 and threshold level 5 to select depending on the comparison result at scale comparator 301.

By this means, it is possible to adequately determine the necessity for retransmission based on condition ion accord with the condition of reception.

Fifth Embodiment

Figure 7:
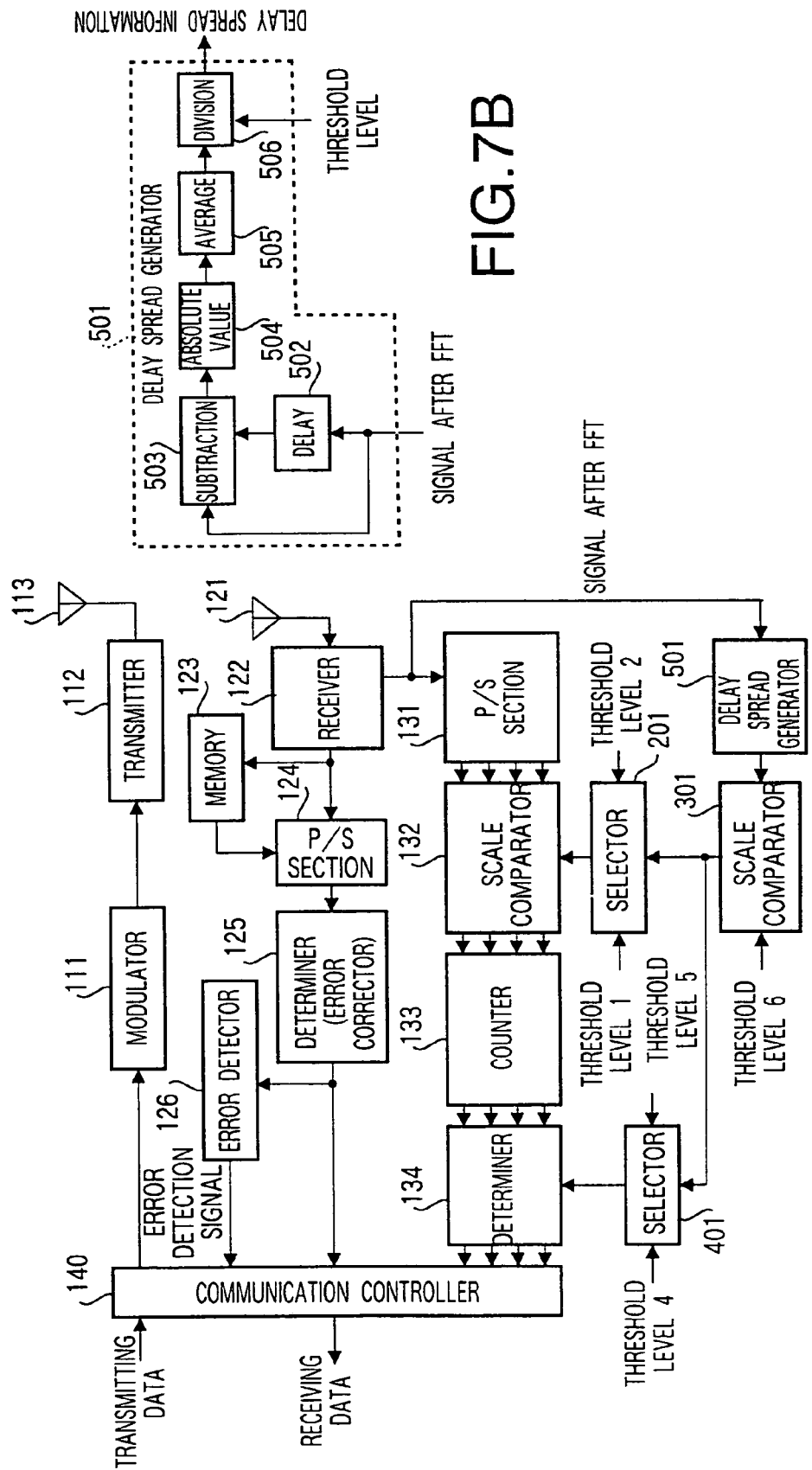
FIG. 7A is a block diagram showing a configuration of a communication apparatus (mobile terminal apparatus) according to a fifth embodiment of the present invention.
FIG. 7B is a block diagram showing a configuration of a delay spread generator of a communication apparatus according to a fifth embodiment of the present invention.

FIG. 7A is a block diagram showing a configuration of a mobile terminal apparatus according to a fifth embodiment, and FIG. 7B is a block diagram showing a configuration of a delay spread generator.

A feature of the present embodiment is to change the threshold level at scale comparator 132 (i.e. threshold level for determining whether a subcarrier has a falling received level) and the threshold level for use for comparison with the count value on counter 133 in accordance with the delay time of multipath.

When the delay time of multipath increases, interference from the signals in the vicinity increases, and the changes in the error rate characteristics increase. For this reason, changing the threshold level that serves as the basis of determination for retransmission processing is effective in terms of the compatibility for the transmission rate and the error rate.

To be more specific, when the delay time of multipath is large, it is preferable to set the threshold level at a large level.

In the mobile terminal apparatus of FIG. 7A, delay spread generator 501 generates delay time information of multipath based on the signals after FFT.

Then, scale comparator 301 determines whether the delay spread is larger than threshold level 6, and, based on the determination result, changes the threshold level at scale comparator 132 (i.e. threshold level for checking whether or not a subcarrier has a falling received level) and the threshold level for use for comparison with the count value on counter 133.

Referring to FIG. 7B, delay spread generator 501 has delayer 502, subtractor 503, circuit 504 that determines absolute values, circuit 505 that determines average values, and division circuit 506.

As the delay spread increases, the difference in the received level between adjacent subcarriers increases. By utilizing this, it is possible to generate delay spread information based on information about the difference between adjacent subcarriers in the received level.

Sixth Embodiment

Figure 8:
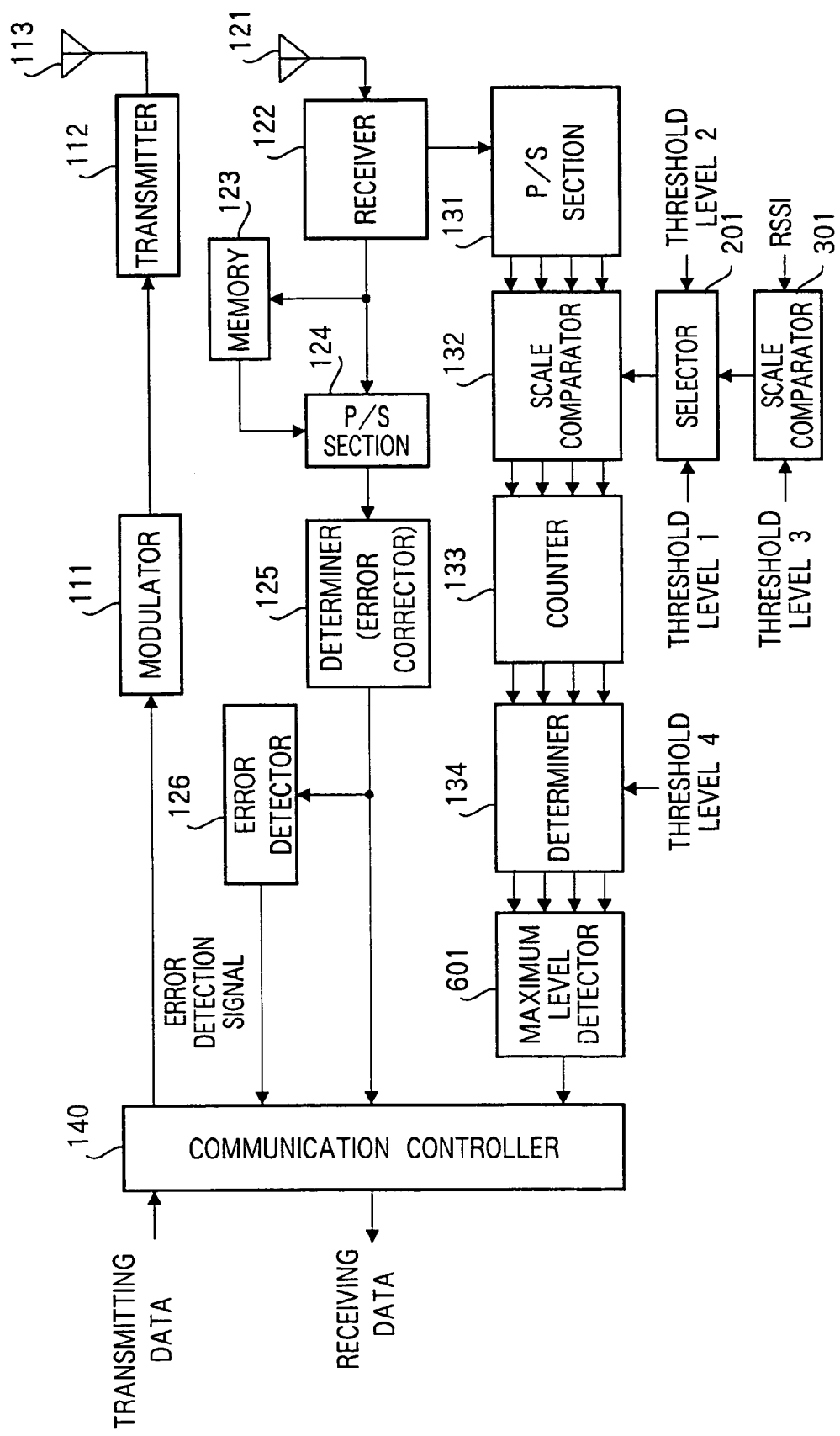
FIG. 8 is a block diagram showing a configuration of a communication apparatus (mobile terminal apparatus) according to a sixth embodiment of the present invention.

FIG. 8 is a block diagram showing a configuration of a mobile terminal apparatus according to a sixth embodiment.

A feature of the present invention is to make only one limited group estimated to have the greatest need for retransmission subject to retransmission request.

There are cases where requesting retransmission to all groups falling under prescribed conditions is practically very difficult. For instance, if the number of the groups subject to retransmission grows, the transmission rate decreases, and there is a threat that the speed of communication cannot be maintained high.

Consequently, in such case, for practical processing, only one group that is estimated to have the greatest need for retransmission is made subject to retransmission. For instance, at maximum level detector 601, comparison is drawn between the count values of the groups having the count values above threshold level 4 determines the maximum count value. Then, the group having this maximum count value is made subject to retransmission. By this means, it is possible to perform error correction of ARQ scheme and satisfy the high-speed aspect of communication.

Seventh Embodiment

Figure 9:
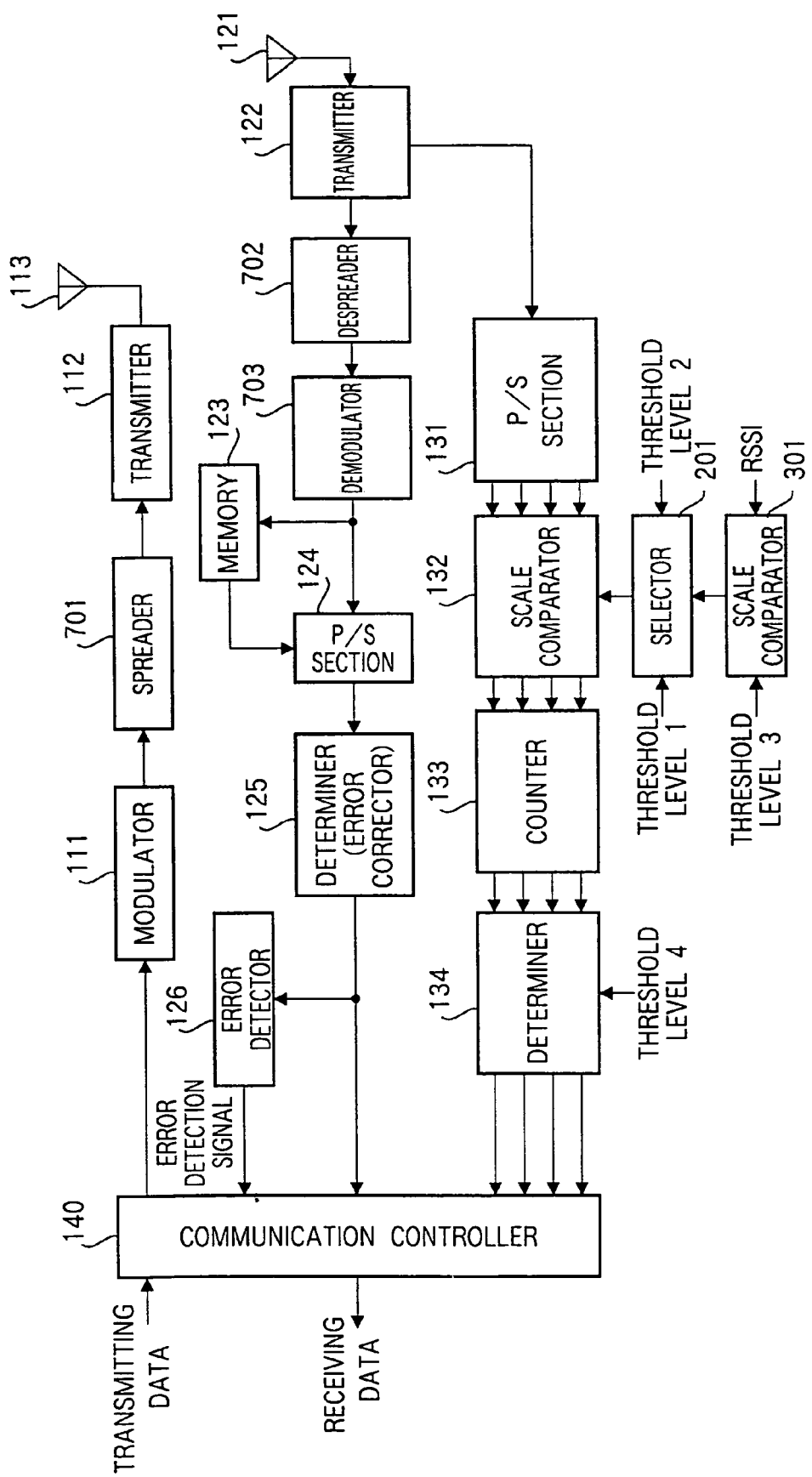
FIG. 9 is a block diagram showing a configuration of a communication apparatus (mobile terminal apparatus) according to a seventh embodiment of the present invention.

FIG. 9 is a block diagram showing a configuration of a mobile terminal apparatus according to a seventh embodiment.

A feature of the present embodiment is to apply a method of dividing all the subcarriers into groups and making the group the unit of retransmission to a communication apparatus that performs communication of OFDM-CDMA (Orthogonal Frequency Division Multiplex-Code Division Multiple Access) scheme, which is considered for a next generation communication scheme.

In OFDM-CDMA schemes, as shown in FIG. 9, a transmitting signal is spread at spreader 701 and thereafter one spread chip is assigned per subcarrier and communication is performed. Upon reception, despreading is performed at despreader 702, demodulation processing is performed at demodulator 703, and information is thus taken.

The communication apparatus of OFDM-CDMA scheme to which the present invention is applied is capable of achieving the novel effect of increasing the number of multiplexing signals, which the communication schemes of OFDM alone cannot achieve.

Eighth Embodiment

Figure 10:
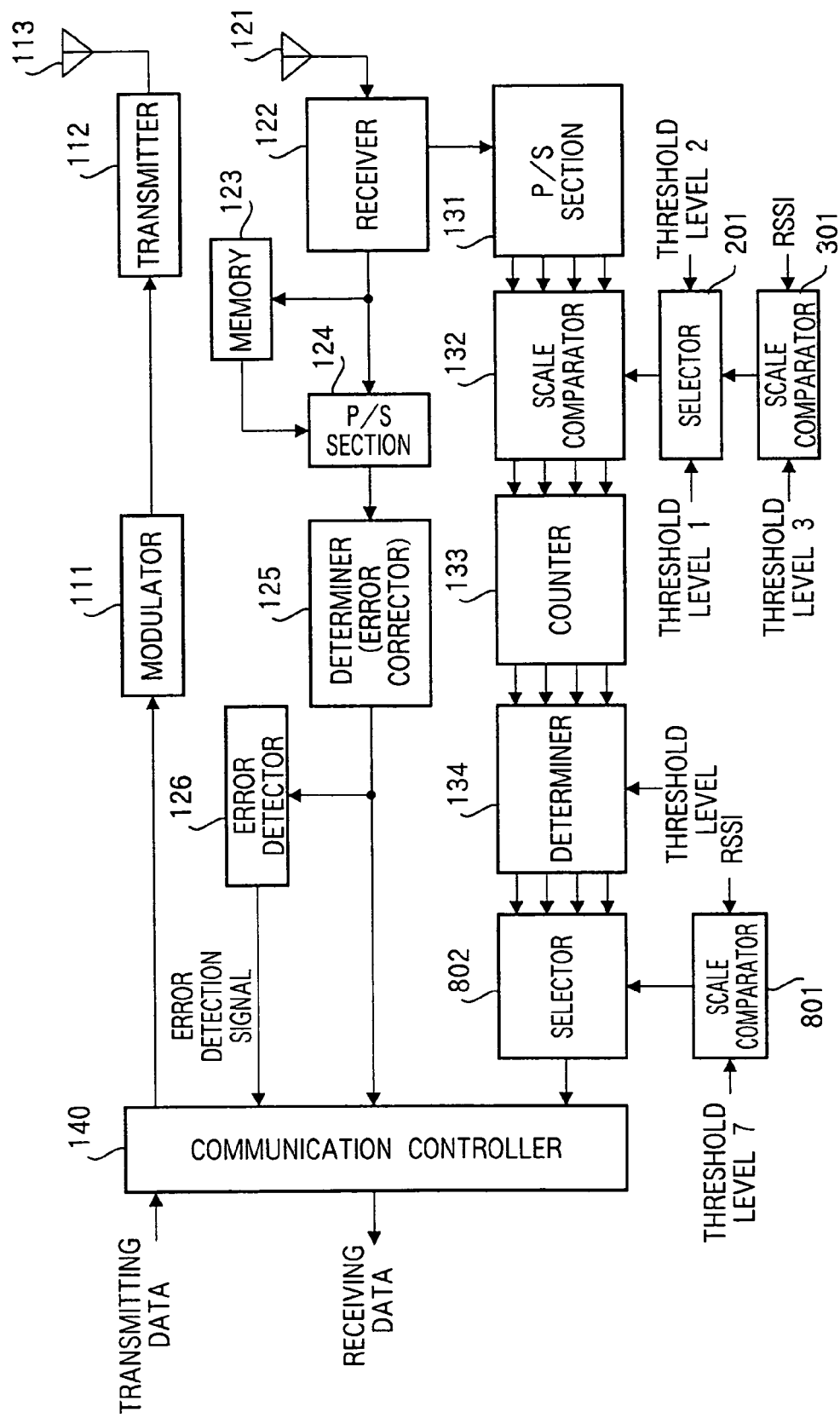
FIG. 10 is a block diagram showing a configuration of a communication apparatus (mobile terminal apparatus) according to an eighth embodiment of the present invention.

FIG. 10 is a block diagram showing a configuration of a mobile terminal apparatus according to an eighth embodiment. A feature of the present embodiment is to change the number (i.e. the upper limit on the number of groups) of the groups that one retransmission request can be directed to based on delay spread and the RSSI.

For instance, as delay spread grows the difference in the received level between adjacent subcarriers increases, and so changing the number of the groups a retransmission request can be directed to in accordance with the delay spread is effective in terms of the compatibility of the transmission rate and the error rate. To be more specific, it is preferable to increase the number of the groups that can be made subject to retransmission as the delay spread grows.

Likewise, changing the number of the groups a retransmission request can be directed to in accordance with the RSSI is effective in terms of the compatibility of the transmission rate and the error rate. To be more specific, it is preferable to increase the number of the groups that can be made subject to retransmission as the RSSI decreases.

Referring to FIG. 10, scale comparator 801 is provided to compare the RSSI and threshold level 7, and, depending on the comparison result, selector 802 changes the number of the groups that can be selected.

Ninth Embodiment

Figure 11:
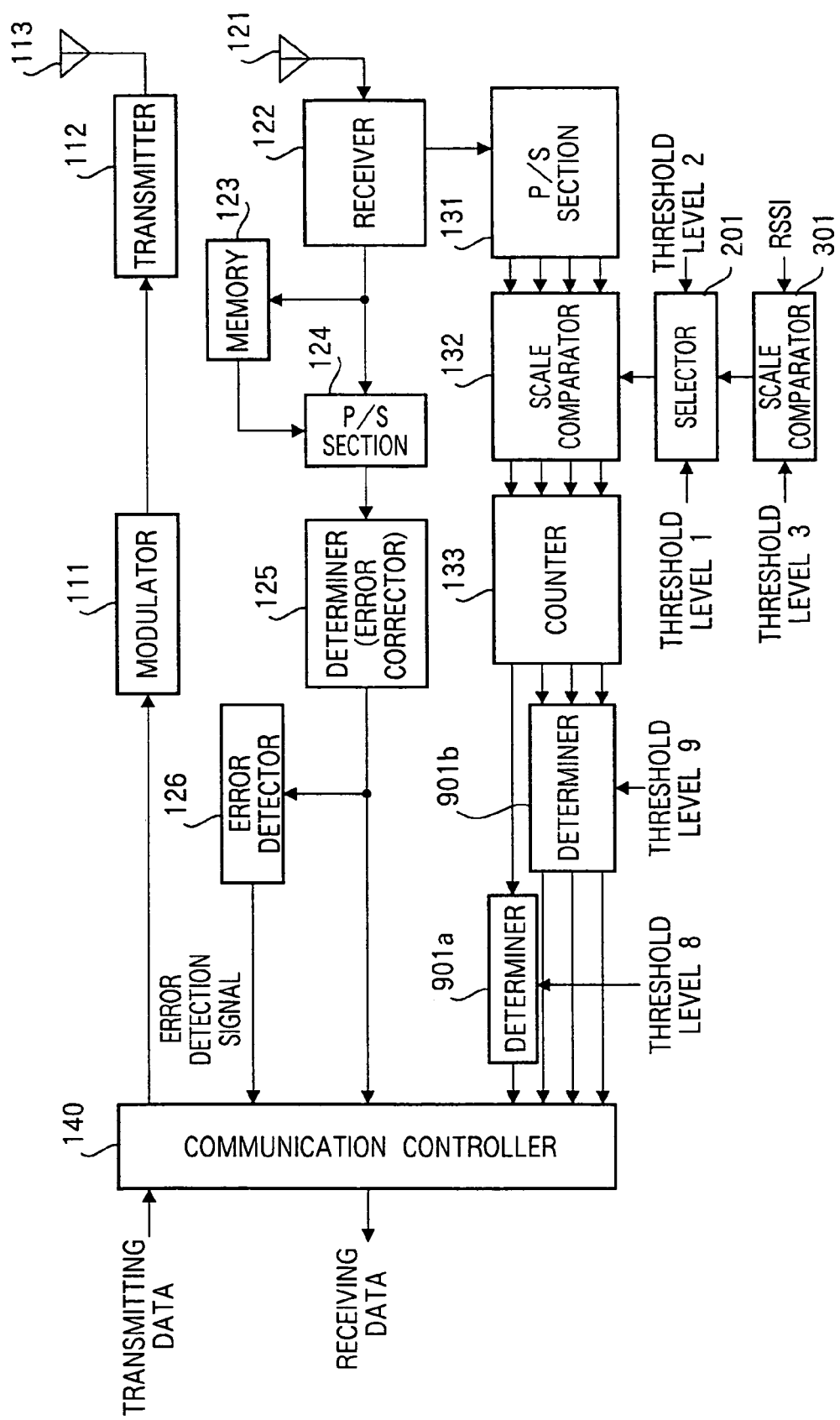
FIG. 11 is a block diagram showing a configuration of a communication apparatus (mobile terminal apparatus) according to a ninth embodiment of the present invention.

FIG. 11 is a block diagram showing a configuration of a mobile terminal apparatus according to a ninth embodiment.

A feature of the present invention is to make a group containing the subcarriers that carry the data corresponding to the direct current component of an analog circuit subject to retransmission more preferentially than other groups.

When the direct current offset of an analogue circuit is large, a group containing the subcarriers corresponding to the direct current component is likely to have increased retransmission requests. This taken into account, the group containing the subcarriers corresponding to the direct current component of the analogue circuit is made subject to retransmission more preferentially than other groups.

Referring to FIG. 11, determiner 901*a* determines whether or not retransmission is necessary with respect to the group containing the subcarriers corresponding to the direct current component, and determiner 901*b* makes determinations for other groups.

By making threshold level 8 for use at determiner 901*a* smaller than threshold level 9 for use at determiner 901*b*, the group containing the subcarriers corresponding to the direct current component is more likely to be made subject to retransmission.

Tenth Embodiment

Figure 12:
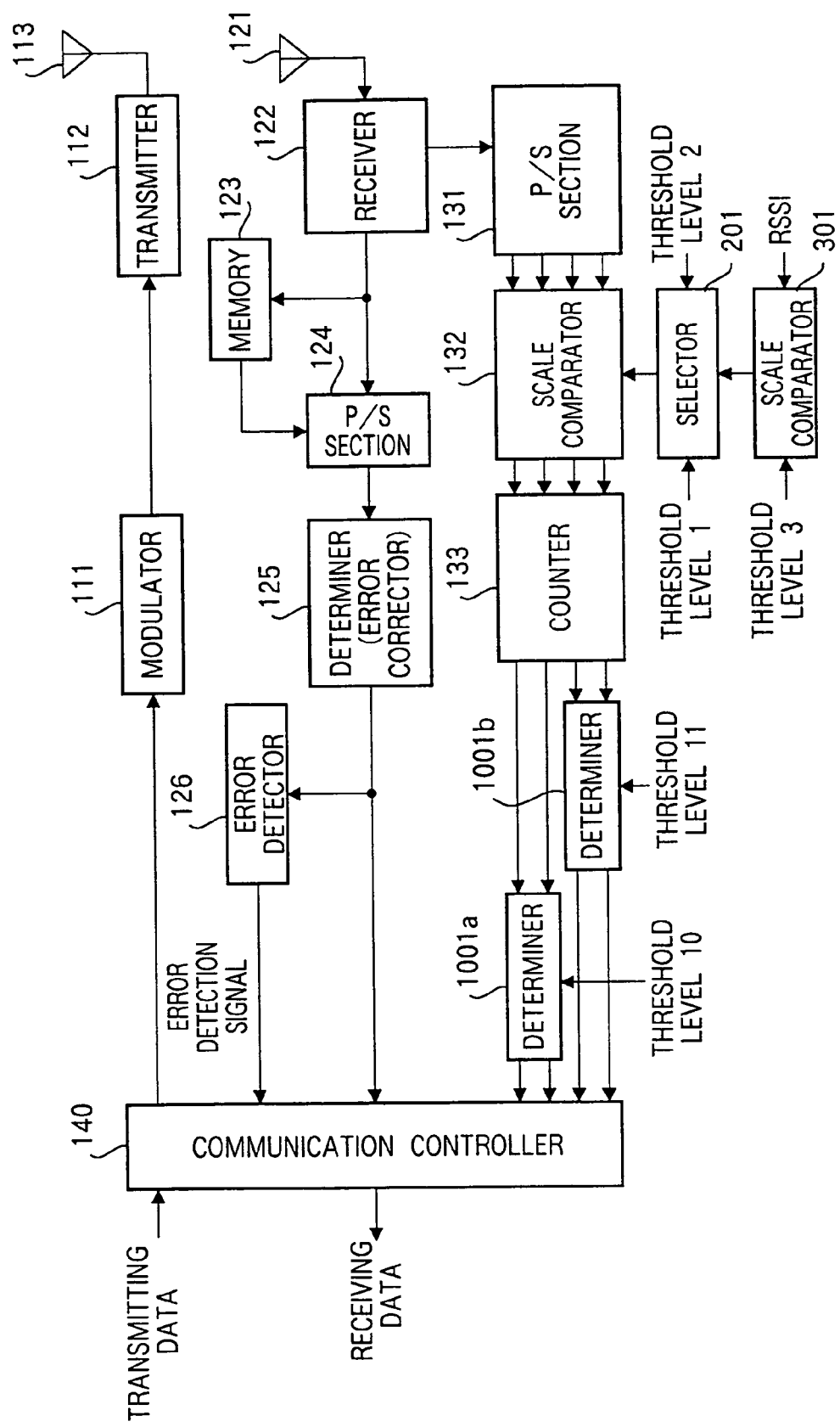
FIG. 12 is a block diagram showing a configuration of a communication apparatus (mobile terminal apparatus) according to a tenth embodiment of the present invention.

FIG. 12 is a block diagram showing a configuration of a mobile terminal apparatus according to a tenth embodiment.

A feature of the present embodiment is to make the group containing, of all the subcarriers, the subcarriers at both ends on the frequency axis (i.e. the subcarrier of the highest frequency and the subcarrier of the lowest frequency among all the subcarriers) subject to retransmission more preferentially than other groups.

The subcarriers at both ends on the frequency axis have more deteriorated error rate characteristics than other groups when there is interference between adjacent channels and group delay deviation of an analogue filter.

Consequently, the group containing the subcarriers at both ends on the frequency axis is made subject to retransmission more preferentially than other groups.

Referring to FIG. 12, determiner 1001*a* determines the necessity for retransmission with respect to the group containing the subcarriers at both ends on the frequency axis. In addition, determiner 1001*b* makes determinations for other groups.

By making threshold level 10 for use at determiner 1001*a* smaller than threshold level 11 for use at determiner 1001*b*, the group containing the subcarriers at both ends on the frequency axis is more likely to be made subject to retransmission.

Eleventh Embodiment

Figure 13:
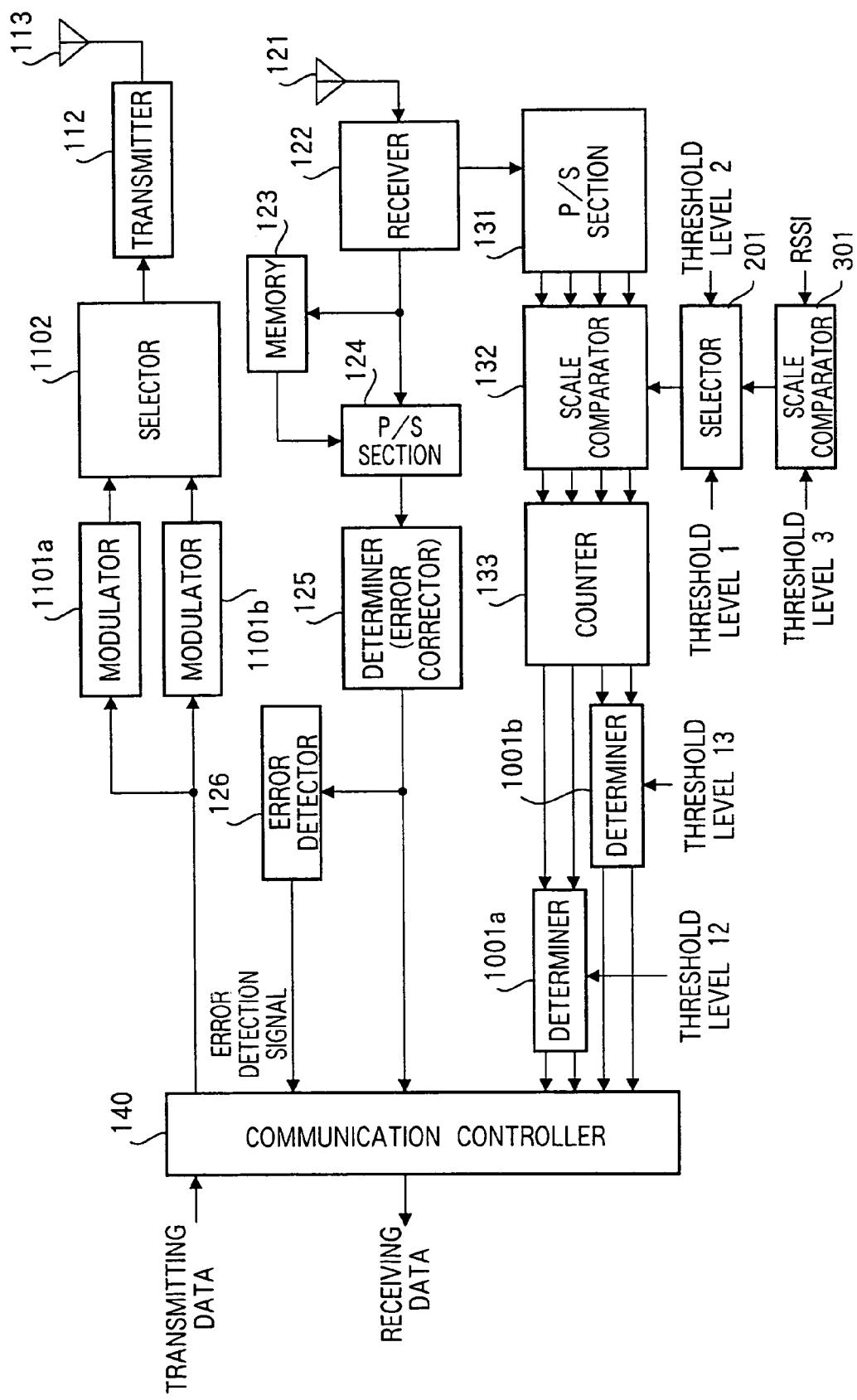
FIG. 13 is a block diagram showing a configuration of a communication apparatus (mobile terminal apparatus) according to an eleventh embodiment of the present invention.

FIG. 13 is a block diagram showing a configuration of a mobile terminal apparatus according to an eleventh embodiment.

A feature of the present embodiment is to make the M value in M-ary modulation with respect the group containing the subcarriers at both ends on the frequency axis or a group containing the subcarriers carrying the data corresponding to the direct current component smaller in comparison to other groups so as to prevent errors.

When the level of interference between adjacent channels is large, or when the direct current offset of an analogue circuit is large, there is a threat that the number of times of retransmission increases substantially and the transmission rate decreases severely with respect to the group containing the subcarriers at both ends on the frequency axis and the group containing the subcarriers corresponding to the direct current component.

Consequently, to minimize the decrease in the transmission rate, the M value in M-ary modulation with respect to a group containing the subcarriers at both ends on the frequency axis and a group containing the subcarriers carrying the data corresponding to the direct current component smaller than other groups so as to prevent errors.

Referring to FIG. 13, the transmission system employs a configuration in which two M-ary modulators 1101a and 1101b are provided and selector 1102 determines which modulation signal to use.

For instance, when M-ary modulator 1101a includes a 16QAM modulator and M-ary modulator 1101b includes a QPSK (Quadrature Phase Shift Keying) modulator, the QPSK signal output that is output from M-ary modulator 1101b with respect to the group containing the subcarriers at both ends on the frequency axis and the group containing the subcarriers carrying the data corresponding to the direct current component, and the 16QAM signal that is output from M-ary modulator 1101a is selected with respect to other groups.

Twelfth Embodiment

In this embodiment, when a group containing the subcarriers carrying the data corresponding to the direct current component is subject to retransmission, a transmitting apparatus (i.e., base station apparatus in the previous embodiments) transmits only those subcarriers corresponding to the direct current component.

The data corresponding to the direct current component of an analogue circuit is very important, and deterioration in quality is particularly a problem. Also, due to various limitations, there may be cases where the amount of data that can be transmitted is severely limited.

In such case, first, only those subcarriers corresponding to the direct current, for which deterioration in quality is particularly a problem, are retransmitted preferentially.

Figure 14:
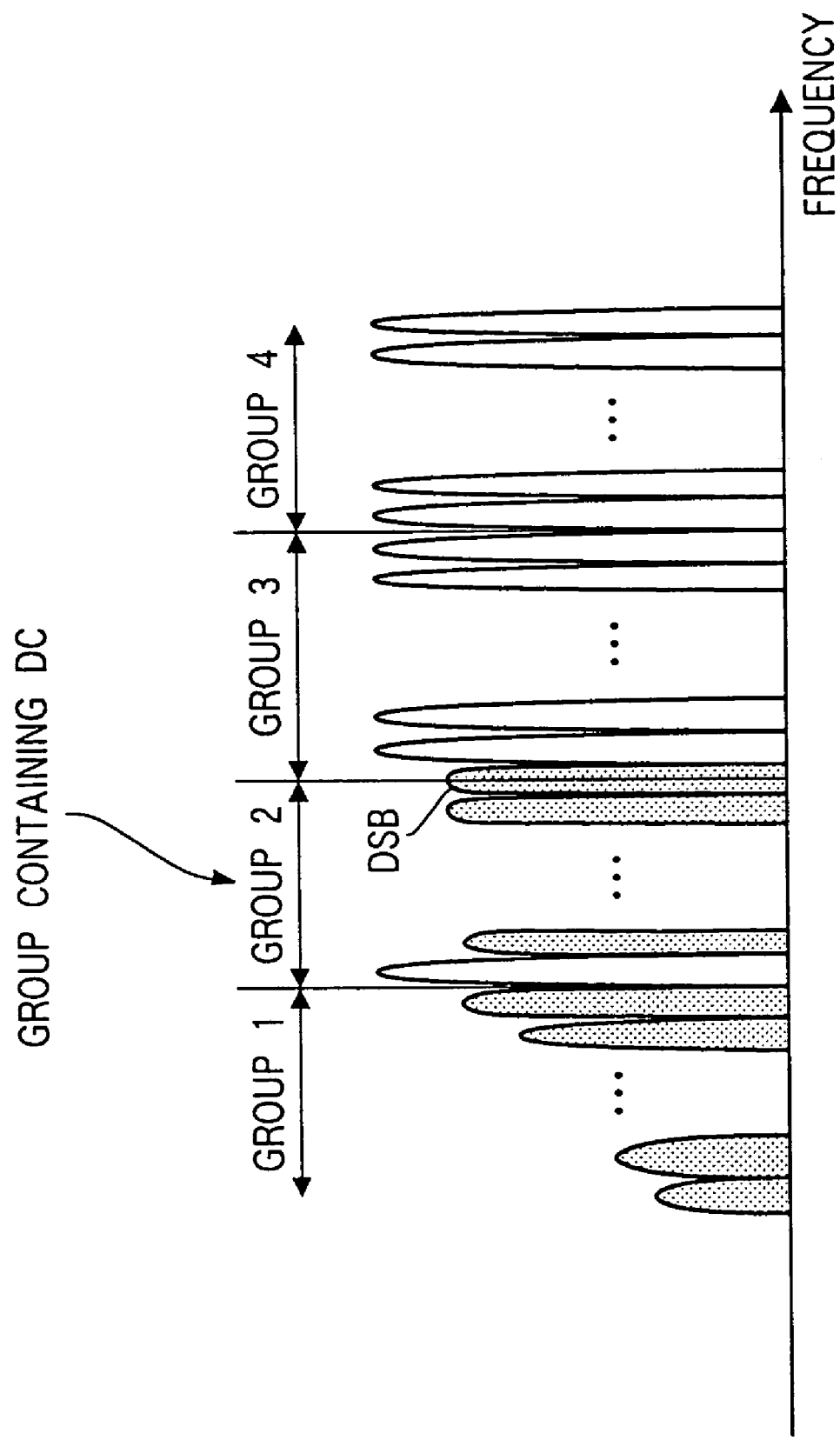
FIG. 14 is a drawing illustrating a data retransmission method according to a twelfth embodiment of the present invention (method wherein only those subcarriers corresponding to the direct current component are made subject to retransmission).

Referring to FIG. 14, group 2 is the group that contains the subcarriers carrying the data corresponding to the data corresponding to the direct current (DC) component, and, when this group 2 is subject to retransmission, first, only those subcarriers carrying the data corresponding to the direct current component (in the drawing, given the code "DSB") are made subject to retransmission.

As described above, the present invention focuses on the characteristics of multicarrier communication as typified by OFDM, and implements a practical ARQ scheme that takes the use with actual communication terminals into account.

For instance, to construct a wireless ATM network by directly linking a wireless communication system to a high speed ATM network utilizing optical fiber, the accuracy of error correction and the high speed in the wireless communication are key points. Consequently, the present invention is effective in implementing high speed mobile communication (i.e. high speed mobile multimedia communication).

Moreover, when a group subject to retransmission is selected based on at least one of: each carrier's received level; indicator that indicates received quality; and delay spread, the group subject to retransmission may be selected by, for example, determining whether the number of carriers having the received level below a predetermined standard contained in a group exceeds a predetermined threshold level. The group serves as the unit, and simple comparison processing is performed with predetermined standards and threshold levels, so that the retransmission processing is simplified and by this means complication of the circuit can be minimized.

Furthermore, a receiving apparatus, of the data that is received first, discards the data corresponding to the group subject to the retransmission request, holds the data corresponding to other groups temporarily, and, when as a result of transmission the data is received with no error, combines the data and the temporarily stored data and outputs the result. The processing of the received data is also thus simple, and, in this regard too, the present invention is readily implementable.

The present application is based on Japanese Patent Application No.2002-097468, filed on Mar. 29, 2002, entire content of which is expressly incorporated herein by reference.

Industrial Applicabilty

The present invention is applicable to mobile terminal apparatus and base station apparatus for use in wireless communication systems.

The invention claimed is:

1. A data receiving apparatus that receives, from a data transmitting apparatus, collective data that is communicated in subsets over a plurality of carrier waves, which are divided into a plurality of carrier wave groups comprising two or more carrier waves, the data receiving apparatus comprising:
   a receiver that receives the collective data and a single error detection code;
   a detector that detects an error in the received collective data using the received single error detection code;
   an estimator that determines the subset of received data having the error; and
   a transmitter that transmits a retransmission request signal identifying the carrier wave group that communicated the subset of data determined to have the error and requesting retransmission of this subset of data.

2. The data receiving apparatus according to claim 1, wherein the estimator determines the subset of data having the error by identifying which of the received carrier waves had a lower receive level than a predetermined threshold level and determining which subset of data was communicated by the identified carrier wave.

3. The data receiving apparatus according to claim 1, further comprising:
   a comparator that compares the receive level of each of the carrier wave groups with a first threshold;
   a counter that counts, for each of the carrier wave groups, the number of carrier waves having receive levels lower than the first threshold; and
   a determiner that determines, for each of the carrier wave groups, whether the counted number of carrier waves is greater than a second threshold, wherein
   the estimator determines the subset of data having the error by identifying which of the carrier wave groups has a counted number that is greater than the second threshold and determining which subset of data was communicated by the identified carrier wave group.

4. The data receiving apparatus according to claim 3, wherein the comparator sets the first threshold to a higher value when the subsets of data are modulated with a modulation scheme that is more prone to errors.

5. The data receiving apparatus according to claim 3, wherein the comparator sets the first threshold to a lower value when the receive quality of the carrier waves increases and sets the first threshold to a higher value when the receive quality of the carrier waves decreases.

6. The data receiving apparatus according to claim 3, wherein the comparator sets the first threshold to a higher value when the delay spread of the received collective data increases.

7. The data receiving apparatus according to claim 3, further comprising:
a maximum value detector that detects, when there are two or more carrier wave groups having counted numbers of carrier waves exceeding the second threshold, a maximum value among the counted numbers of carrier waves for these carrier wave groups, wherein
the retransmission request signal identifies the carrier wave group having the maximum value as the carrier wave group that communicated the subset of data determined to have the error.

8. The data receiving apparatus according to claim 3, wherein the determiner determines whether the counted number of carrier waves is greater than the second threshold for each of the carrier wave groups except a group having a carrier wave corresponding. to a direct current component and determines whether the counted number of carrier waves for the excepted group is greater that a third threshold, which has a lower value than the second threshold.

9. The data receiving apparatus according to claim 3, wherein the determiner determines whether the counted number of carrier waves is greater than the second threshold for each of the carrier wave groups except the carrier wave groups having the lowest and highest frequency carrier waves and determines whether the counted numbers of carrier waves for the excepted groups are greater than a third threshold, which has a lower value than the second threshold.

10. The data receiving apparatus according to claim 1, wherein the upper limit number of carrier wave groups that are identified within the retransmission request signal, as those that communicated the subset of data determined to have the error, increases as the delay spread of the received collective data increases.

11. The data receiving apparatus according to claim 1, wherein the upper limit number of carrier wave groups that are identified within the retransmission request signal, as those that communicated the subset of data determined to have the error, increases as the receive quality of the collective data decreases.

12. A mobile communication terminal apparatus comprising the data receiving apparatus of claim 1.

13. A base station apparatus comprising the data receiving apparatus of claim 1.

14. A method of receiving, from a data transmitting apparatus, collective data that is communicated in subsets over a plurality of carrier waves, which are divided into a plurality of carrier wave groups comprising two or more carrier waves, the method comprising:
receiving the collective data and a single error detection code;
detecting an error in the received collective data using the received single error detection code;
determining the subset of received data having the error; and
transmitting a retransmission request signal identifying the carrier wave group that communicated the subset of data determined to have the error and requesting retransmission of this subset of data.

* * * * *